June 30, 1970

ANAMORPHOTIC OBJECTIVE

Filed March 15, 1968

Kurt Lindstedt
Kurt Kirchhoff
Inventors.

By
Attorney

Kurt Lindstedt
Kurt Kirchhoff
Inventors.

Kurt Lindstedt
Kurt Kirchhoff
Inventors.

United States Patent Office 3,517,984
Patented June 30, 1970

3,517,984
ANAMORPHOTIC OBJECTIVE
Kurt Lindstedt, Gottingen-Weende, and Kurt Kirchhoff, Hamburg-Lurup, Germany, assignors to Isco Optische Werke G.m.b.H., Gottingen, Germany, a corporation of Germany
Filed Mar. 15, 1968, Ser. No. 713,468
Claims priority, application Germany, Mar. 30, 1967, J 33,334
Int. Cl. G02b *13/08*
U.S. Cl. 350—181    8 Claims

ABSTRACT OF THE DISCLOSURE

An anamorphotic component with a pair of oppositely refractive cylindrical doublets, i.e. an object-side negative doublet having a weakly collective cemented surface and an image-side positive doublet having a weakly dispersive cemented surface, is disposed between a three-member spherically effective basic objective and a front component which includes two closely spaced, substantially conjugate focusing lenses and which may also include a spherically effective member of positive refractivity ahead of these conjugated lenses.

---

Our present invention relates to an optical objective system of the anamorphotic type, more particularly a system including, in addition to a spherically effective basic objective, an anamorphotic component of the type disclosed and claimed in our copending application Ser. No. 713,467 of even date. Such systems are used, for example, in the taking of wide-angle motion pictures and in their subsequent projection upon a wide screen; they may also be utilized for the photographing of panoramic still pictures on film of normal size and for subsequent reproduction thereof on outsized postcards or the like.

The general object of this invention is to provide an anamorphotic objective system of the character referred to, with a pair of cylindrically curved lens members of opposite refractivity constituting an afocal group within their optically effective (usually horizontal) plane, which enables the taking or the projection of pictures with contraction or expansion in that plane by a factor on the order of 1.5, thereby affording an increase of the field angle on the object side (i.e. the side of the longer light rays) to a value of approximately 60° as compared with the usual angle of about 39°, with minimization of the distortion which in conventional systems may be as high as 25% and which is particularly objectionable in the taking of still pictures.

Another object of this invention is to provide a lens assembly for the taking or the projection of pictures which can be converted into an enlargement objective of large magnification ratio, particularly in the optically effective plane of the anamorphotic component, through the addition of a single collective lens members at the front.

These objects are realized, pursuant to our present invention, by the provision of an objective system whose anamorphotic component, interposed between a spherically effective basic objective and a spherically effective front component, consists of a biconcave front doublet with a weakly collective cemented surface and a biconvex rear doublet with a weakly dispersive cemented surface, these doublets being conjugate in a manner known per se to form an afocal group in a plane perpendicular to their axes of curvature; the basic objective may consist of three air-spaced lens members, preferably singlets, of positive, negative and positive refractivity, respectively.

The front component may include a substantially afocal pair of spherically curved lenses of opposite refractivity, either or both of these lenses being axially shiftable to focus the objective; if this objective is equipped with its own focusing means, the latter may be immobilized in a predetermined position (preferably set for infinity) so that all the focusing may be carried out with the aid of this lens pair.

The front component may also include a spherically curved lens member of collective character having a focal length substantially greater than that of the basic objective, preferably about 5 to 10 times as great, whereby the entire system can be used as an enlargement objective with a magnification ratio which may exceed a factor of 8 in the optically effective plane of the anamorphotic component.

The invention will be described in greater detail hereinafter with reference to the accompanying drawing in which.

Figure 1:
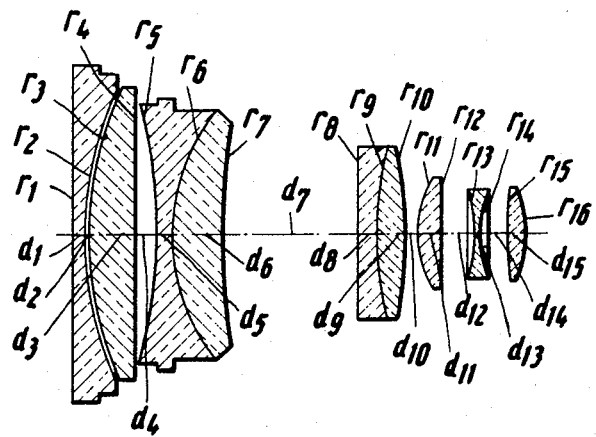
FIG. 1 is a horizontal section of an optical system according to the invention, adapted particularly for picture-taking.
Figure 1A:
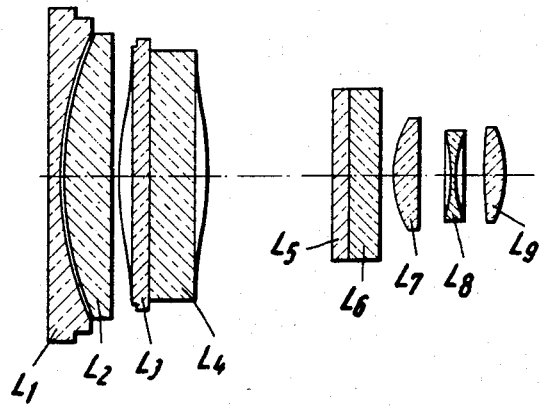
FIG. 1a shows the same system in vertical section.

In FIGS. 1 and 1a we have shown an optical objective system comprising a front group with two spherically curved lenses $L_1$, $L_2$ constituting a substantially afocal pair, either or both of these lenses being axially adjustable for focusing purposes. Lens $L_1$ is planoconcave, with radii $r_1$, $r_2$ and thickness $d_1$, and separated by a small air gap $d_2$ from planoconvex lens $L_2$ having radii $r_3$, $r_4$ and thickness $d_3$. A further air space $d_4$ intervenes between this lens pair and a first cylindrical doublet of negative refractivity, consisting of a biconcave lens $L_3$ (radii $r_5$, $r_6$ and thickness $d_5$) cemented onto a meniscus-shaped positive lens $L_4$ (radii $r_6$, $r_7$ and thickness $d_6$). This doublet is followed, after a wide air space $d_7$, by a positively refracting cylindrical doublet consisting of a meniscus-shaped negative lens $L_5$ (radii $r_8$, $r_9$ and thickness $d_8$) cemented onto a biconvex lens $L_6$ (radii $r_9$, $r_{10}$ and thickness $d_9$). Another relatively small air space $d_{10}$ separates the latter doublet from the first member $L_7$ of a basic three-member objective, lens $L_7$ being a planoconvex singlet with radii $r_{11}$, $r_{12}$ and thickness $d_{11}$; lens $L_7$ precedes by an air space $d_{12}$ a biconcave singlet $L_8$ (radii $r_{13}$, $r_{14}$ and thickness $d_{14}$) which is followed, after an air space $d_{14}$, by a biconvex rear lens $L_9$ (radii $r_{15}$, $r_{16}$ and thickness $d_{15}$).

The forwardly spaced cemented surfaces $r_6$ and $r_9$ of the anamorphotic doublets are wealky refractive since the glasses of their respective constituent lenses differ only slightly in their refractive indices; more particularly, surface $r_6$ is of positive power while surface $r_9$ is of negative power.

In the following Table I we have listed representative values for the radii $r_1$ to $r_{16}$ and the thicknesses and separations $d_1$ to $d_{15}$ of the system shown in FIGS. 1 and 1a, based upon a numerical value of unity for the overall focal length of the spherical components $L_7$–$L_9$, together with the individual surface powers $\Delta n/r$, the refractive indices $n_d$ for the yellow *d*-line of the spectrum, and the dispersion ratios or Abbé numbers $v$; in view of permissible tolerances, some of the decimals listed in Table I and following tables for the sake of completeness are considered insignificant for the purpose of defining an operative system.

As will be apparent from the drawing and from the numerical values given below, the afocal pair of the front component is bounded by the planar outer surfaces $r_1$, $r_4$ of its planoconcave lens $L_1$ and its planoconvex lens $L_2$ whose curved inner surfaces $r_2$ and $r_3$ of substantially the same radius of curvature, are closely spaced from each other. This affords a high degree of compactness, whether the afocal pair stands alone or is preceded, as in FIGS. 3 and 4 described hereinafter, by a further lens number with a nonconvex rear surface.

TABLE I

| Lens | Radii | Thicknesses and Separations | $n_d$ | $\nu$ | $\Delta n/r$ |
|---|---|---|---|---|---|
| $L_1$ | $r_1=\infty$ | $d_1=0.0439$ | 1.57125 | 55.9 | 0 |
| | $r_2=+1.1879$ | $d_2=0.0086$ | | Air space | $-0.480909$ |
| $L_2$ | $r_3=+1.1920$ | $d_3=0.1336$ | 1.57125 | 55.9 | $+0.479230$ |
| | $r_4=\infty$ | $d_4=0.0668$ | | Air space | 0 |
| $L_3$ | $r_5=-1.6563$ | $d_5=0.0572$ | 1.62286 | 60.0 | $-0.376051$ |
| $L_4$ | $r_6=+0.6781$ | $d_6=0.1622$ | 1.62408 | 36.1 | $+0.001799$ |
| | $r_7=+2.3475$ | $d_7=0.4688$ | | Air space | $-0.265850$ |
| $L_5$ | $r_8=+7.3771$ | $d_8=0.0630$ | 1.62408 | 36.1 | $+0.084597$ |
| $L_6$ | $r_9=+1.0800$ | $d_9=0.1107$ | 1.62286 | 60.0 | $-0.001130$ |
| | $r_{10}=-1.6334$ | $d_{10}=0.0300$ | | Air space | $+0.381323$ |
| $L_7$ | $r_{11}=+0.3803$ | $d_{11}=0.0840$ | 1.62555 | 57.8 | $+1.645033$ |
| | $r_{12}=\infty$ | $d_{12}=0.0954$ | | Air space | 0 |
| $L_8$ | $r_{13}=-0.5531$ | $d_{13}=0.0134$ | 1.63004 | 35.5 | $-1.139006$ |
| | $r_{14}=+0.3848$ | $d_{14}=0.0954$ | | Air space | $-1.637531$ |
| $L_9$ | $r_{15}=+1.6881$ | $d_{15}=0.0611$ | 1.63555 | 57.8 | $+0.370563$ |
| | $r_{16}=-0.4350$ | | | | $+1.438006$ |

The objective system specified in the foregoing table has an apparent focal length of 0.707 linear units in the optically effective horizontal plane of the anamorphotic system (FIG. 1), as compared with a focal length of one linear unit (equal, for example, to 50 mm.) in the vertical plane (FIG. 1a); the back-focal length of the system equals 0.803 linear units.

Figure 2:
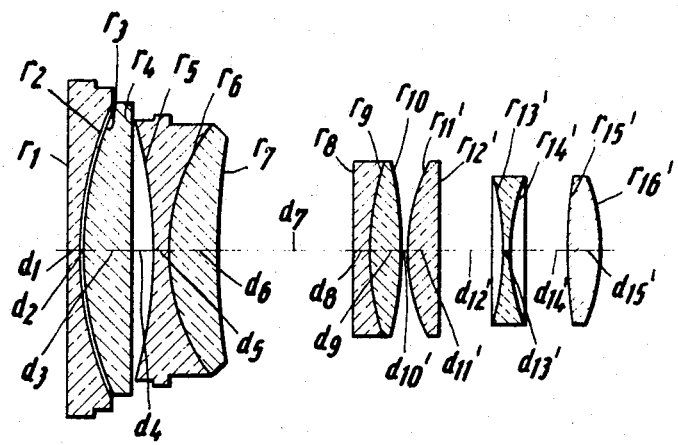
FIGS. 2 and 2a are views similar to FIGS. 1 and 1a, respectively, showing a slightly modified system according to the invention particularly adapted for picture-projection.
Figure 2A:
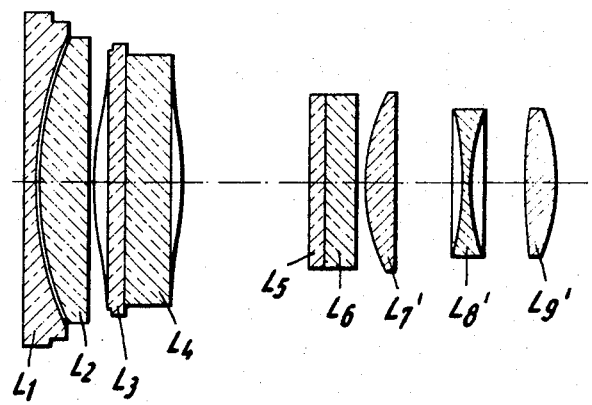

In FIGS. 2 and 2a we have shown a system differing from that of FIGS. 1 and 1a only by the choice of a basic objective whose lens members $L_7'$, $L_8'$ and $L_9'$ have radii $r_{11}'$ to $r_{16}'$ as well as thicknesses and air spaces $d_{10}'$ to $d_{15}'$ which, again together with their corresponding indices of refraction, Abbé numbers and surface powers, have been compiled in the following table:

TABLE II

| Lens | Radii | Thicknesses and Separations | $n_d$ | $\nu$ | $\Delta n/r$ |
|---|---|---|---|---|---|
| | | $d_{10}'=0.0190$ | | Air space | $+0.984230$ |
| $L_7'$ | $r_{11}'=+0.6356$ | $d_{11}'=0.0970$ | 1.62554 | 57.9 | 0 |
| | $r_{12}'=\infty$ | $d_{12}'=0.2120$ | | Air space | $-0.765120$ |
| $L_8'$ | $r_{13}'=-0.8533$ | $d_{13}'=0.0230$ | 1.65285 | 33.5 | $-1.129980$ |
| | $r_{14}'=+0.5778$ | $d_{14}'=0.2010$ | | Air space | $+0.312460$ |
| $L_9'$ | $r_{15}'=+2.0020$ | $d_{15}'=0.0970$ | 1.62554 | 57.9 | $+0.937070$ |
| | $r_{16}'=-0.6676$ | | | | |

The aforestated tolerances apply also to this system, which has an overall focal length of 1.617 units in the vertical plane and an apparent focal length of 1.14 units in the horizontal plane, the back-focal length being 1.319 units.

Figure 3:
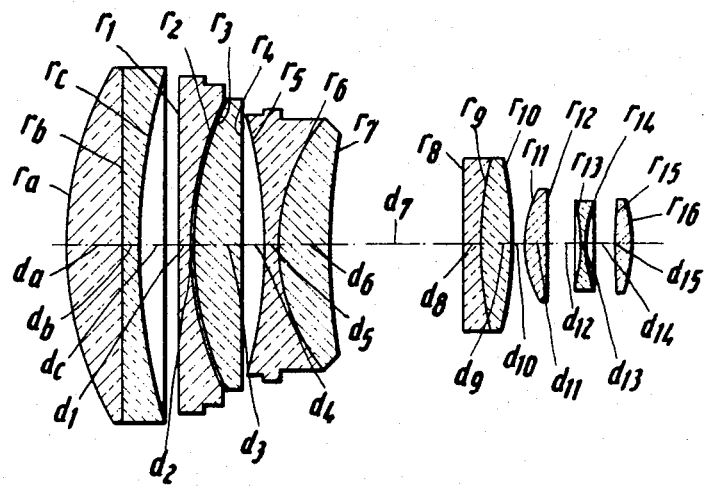
FIGS. 3 and 3a are further views similar to FIGS. 1 and 1a, respectively, showing the system of the first embodiment converted into an enlargement objective.
Figure 3A:
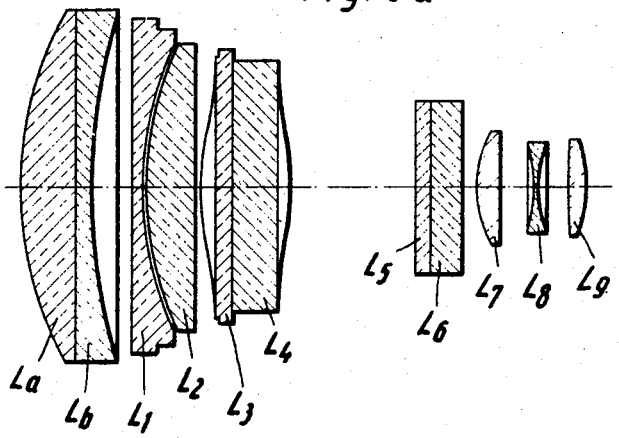

FIGS. 3 and 3a show the system of FIGS. 1 and 1a supplemented by a compound lens member at the front, consisting of a planoconvex lens $L_a$ with radii $r_a$, $r_b$ and thickness $d_a$ cemented onto a planoconcave lens $L_b$ with radii $r_b$, $r_c$ and thickness $d_b$; the space intervening between the collective spherical lens members $L_a$, $L_b$ and the planoconcave lens $L_1$ of the focusing group has been designated $d_c$. The inclusion of lens member $L_a$, $L_b$ creates an enlargement objective which, with the numerical values listed in the following Table III, has a magnification ratio of 4.1:1 in the horizontal plane and a front-focal length of 4.308 units, the back-focal length being equal to 0.803 unit as in the system of Table I:

TABLE III

| Lens | Radii | Thicknesses and Separations | $n_d$ | $\nu$ | $\Delta n/r$ |
|---|---|---|---|---|---|
| $L_a$ | $r_a=+1.2094$ | $d_a=0.2080$ | 1.62286 | 60.0 | $+0.514990$ |
| $L_b$ | $r_b=11.3300$ | $d_b=0.0570$ | 1.62408 | 36.1 | $-0.000110$ |
| | $r_c=+2.1055$ | $d_c=0.1250$ | | Air space | $-0.296440$ |

Figure 4:
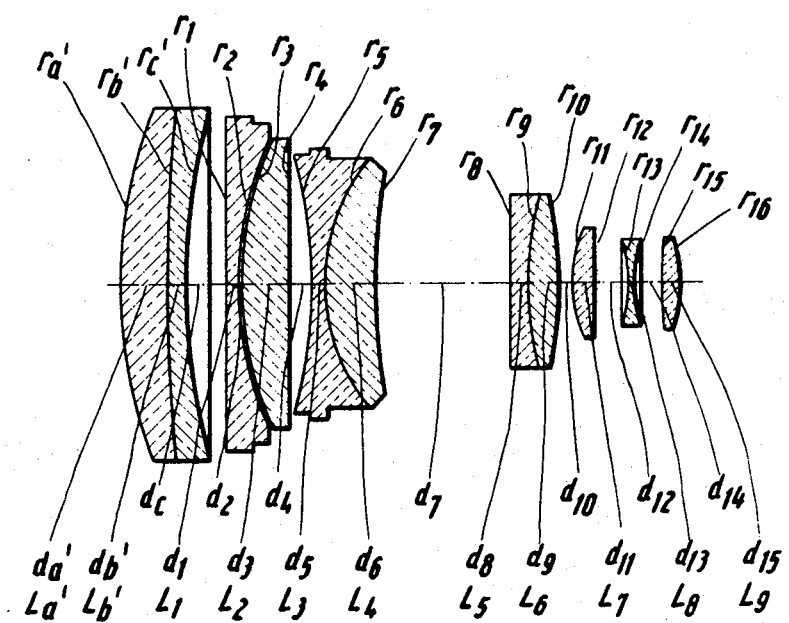
FIG. 4 is a view similar to FIG. 3, illustrating a slightly modified enlargement objective according to the invention.

FIG. 4 shows a modified front member $L_a'$, $L_b'$ whose radii $r_a'$, $r_b'$, $r_c'$ and thicknesses $d_a'$, $d_b'$ have been listed in the following Table IV, the system of FIG. 4 differing from that of FIGS. 3 and 3a by having a horizontal-plane magnification ratio of 8.45:1, its front-focal length being 8.77 linear units:

TABLE IV

| Lens | Radii | Thicknesses and Separations | $n_d$ | $\nu$ | $\Delta n/r$ |
|---|---|---|---|---|---|
| $L_a'$ | $r_a'=+1.6437$ | $d_a'=0.1670$ | 1.62286 | 60.0 | $+0.378950$ |
| $L_b'$ | $r_b'=+6.7998$ | $d_b'=0.0560$ | 1.62408 | 36.1 | $+0.000180$ |
| | $r_c'=+2.2690$ | | | | $-0.275040$ |

The anamorphotic components $L_3$–$L_6$ may be modified by replacing the parameters listed in Table I with the values of the following Table V, again with observation of the aforementioned tolerances:

TABLE V

| Lens | Radii | Thicknesses and Separations | $n_d$ | $\nu$ | $\Delta n/r$ |
|---|---|---|---|---|---|
| $L_3$ | $r_5=-1.7360$ | $d_5=0.060$ | 1.62286 | 60.0 | $-0.35879$ |
| $L_4$ | $r_6=+0.7107$ | $d_6=0.170$ | 1.62408 | 36.1 | $+0.00172$ |
| | $r_7=+2.4604$ | $d_7=0.491$ | | Air space | $-0.25365$ |
| $L_5$ | $r_8=+7.6720$ | $d_8=0.066$ | 1.62408 | 36.1 | $+0.08135$ |
| $L_6$ | $r_9=+1.1320$ | $d_9=0.116$ | 1.62286 | 60.0 | $-0.00108$ |
| | $r_{10}=-1.7120$ | | | | $+0.36382$ |

The objectives herein disclosed have a distortion of not more than 5 to 10%.

We claim:

1. An optical objective system comprising a spherically effective basic objective; a spherically effective front component on the object side of said objective, said front component including a substantially planoconcave lens and a substantially planoconvex lens with closely juxtaposed curved surfaces of substantially the same radius of curvature defining a substantially afocal pair; and an anamorphotic component consisting of a biconcave front doublet with a weakly collective cemented surface immediately adjacent said substantially afocal pair and of a biconvex rear doublet with a weakly dispersive cemented surface immediately adjacent said objective, said doublets being bounded by surfaces cylindrically curved about parallel axes and together forming an afocal group in a plane perpendicular to said axes; said basic objective consisting of three air-spaced lens members including a positively refracting first lens member, a negatively refracting second lens member and a positively refracting third lens member.

2. A system as defined in claim 1 wherein said lens members are singlets.

3. A system as defined in claim 2 wherein said first lens member $L_7$, said second lens member $L_8$ and said third lens member $L_9$ have radii $r_{11}$ to $r_{16}$ and thicknesses and separations $d_{11}$ to $d_{15}$ whose numerical values, based upon a numerical value of unity for the overall focal length of said objective, together with the numerical values of their refractive indices $n_d$ and their Abbé numbers $\nu$ are substantially as given in the following table:

| Lens | Radii | Thicknesses and Separations | $n_d$ | $\nu$ |
|---|---|---|---|---|
| $L_7$ | $r_{11}=+0.38$ | $d_{11}=0.08$ | 1.63 | 57 |
|  | $r_{12}=\infty$ | $d_{12}=0.10$ | Air space | |
| $L_8$ | $r_{13}=-0.55$ | $d_{13}=0.01$ | 1.63 | 35 |
|  | $r_{14}=+0.38$ | $d_{14}=0.10$ | Air space | |
| $L_9$ | $r_{15}=+1.69$ | $d_{15}=0.06$ | 1.64 | 57 |
|  | $r_{16}=-0.43$ | | | |

4. The system as defined in claim 2 wherein said first lens member $L_7'$, said second lens member $L_8'$ and said third lens member $L_9'$ have radii $r_{11}'$ to $r_{16}'$ and thicknesses and separations $d_{11}'$ to $d_{15}'$ whose numerical values, based upon a numerical value of 1.617 for the overall focal length of said objective, together with the numerical values of their refractive indices $n_d$ and their Abbé number $\nu$ are substantially as given in the following table:

| Lens | Radii | Thicknesses and Separations | $n_d$ | $\nu$ |
|---|---|---|---|---|
| $L_7'$ | $r_{11}'=+0.64$ | $d_{11}'=0.10$ | 1.63 | 57 |
|  | $r_{12}'=\infty$ | $d_{12}'=0.21$ | Air space | |
| $L_8'$ | $r_{13}'=-0.85$ | $d_{13}'=0.02$ | 1.65 | 33 |
|  | $r_{14}'=+0.58$ | $d_{14}'=0.20$ | Air space | |
| $L_9'$ | $r_{15}'=+2.00$ | $d_{15}'=0.10$ | 1.63 | 57 |
|  | $r_{16}'=-0.67$ | | | |

5. A system as defined in claim 1 wherein said planoconcave lens $L_1$ and plano-convex lens $L_2$ have radii $r_1$ to $r_4$, thicknesses $d_1$, $d_3$ separation $d_2$ whose numerical values, based upon a numerical value of unity for the focal length of said objective, together with the numerical values of their refractive indices $n_d$ and their Abbé numbers $\nu$ are substantially as given in the following table:

| Lens | Radii | Thicknesses and Separations | $n_d$ | $\nu$ |
|---|---|---|---|---|
| $L_1$ | $r_1=\infty$ | $d_1=0.04$ | 1.57 | 55 |
|  | $r_2=+1.19$ | $d_2=0.01$ | Air space | |
| $L_2$ | $r_3=+1.19$ | $d_3=0.13$ | 1.53 | 55 |
|  | $r_4=\infty$ | | | |

6. An optical objective system comprising a spherically effective basic objective; a spherically effective front component on the object side of said objective, said front component including a substantially planoconcave lens, a substantially planoconvex lens with closely juxtaposed curved surfaces of substantially the same radius of curvature defining a substantially afocal pair and, ahead of said substantially afocal pair, a spherically effective collective lens member having a focal length substantially exceeding that of said objective; and an anamorphotic component consisting of a biconcave front doublet with a weakly collective cemented surface immediately adjacent said substantially afocal pair and of a biconvex rear doublet with a weakly dispersive cemented surface immediately adjacent said objective, said doublets being bounded by surfaces cylindrically curved about parallel axes and together forming an afocal group in a plane perpendicular to said axes.

7. A system as defined in claim 6 wherein said collective lens member consists of a planoconvex lens $L_a$ and a planoconcave lens $L_b$ cemented together along their planar surfaces.

8. A system as defined in claim 7 wherein said planoconcave lens $L_a$ and a planoconvex lens $L_b$ have radii $r_a$ and $r_c$ and thicknesses $d_a$, $d_b$ whose numerical values, based upon a numerical value of unity for the focal length of said objective, together with the numerical values of their refractive indices $n_d$ and their Abbé numbers $\nu$ are substantially as given in the following table:

| Lens | Radii | Thicknesses | $n_d$ | $\nu$ |
|---|---|---|---|---|
| $L_a$ | $r_a=+1.21$ | $d_a=0.21$ | 1.62 | 60 |
|  | $r_b=-11.33$ | | | |
| $L_b$ | $r_c=+2.11$ | $d_b=0.06$ | 1.62 | 36 |

References Cited

UNITED STATES PATENTS 2,453,260 11/1948 Pestrecov _____ 350—226
2,731,883 1/1956 Köhler et al. _____ 350—181

FOREIGN PATENTS 1,082,780 6/1954 France.
971,992 5/1959 Germany.

JOHN K. CORBIN, Primary Examiner

U.S. Cl. X.R.

350—212, 226